Patented Apr. 21, 1931

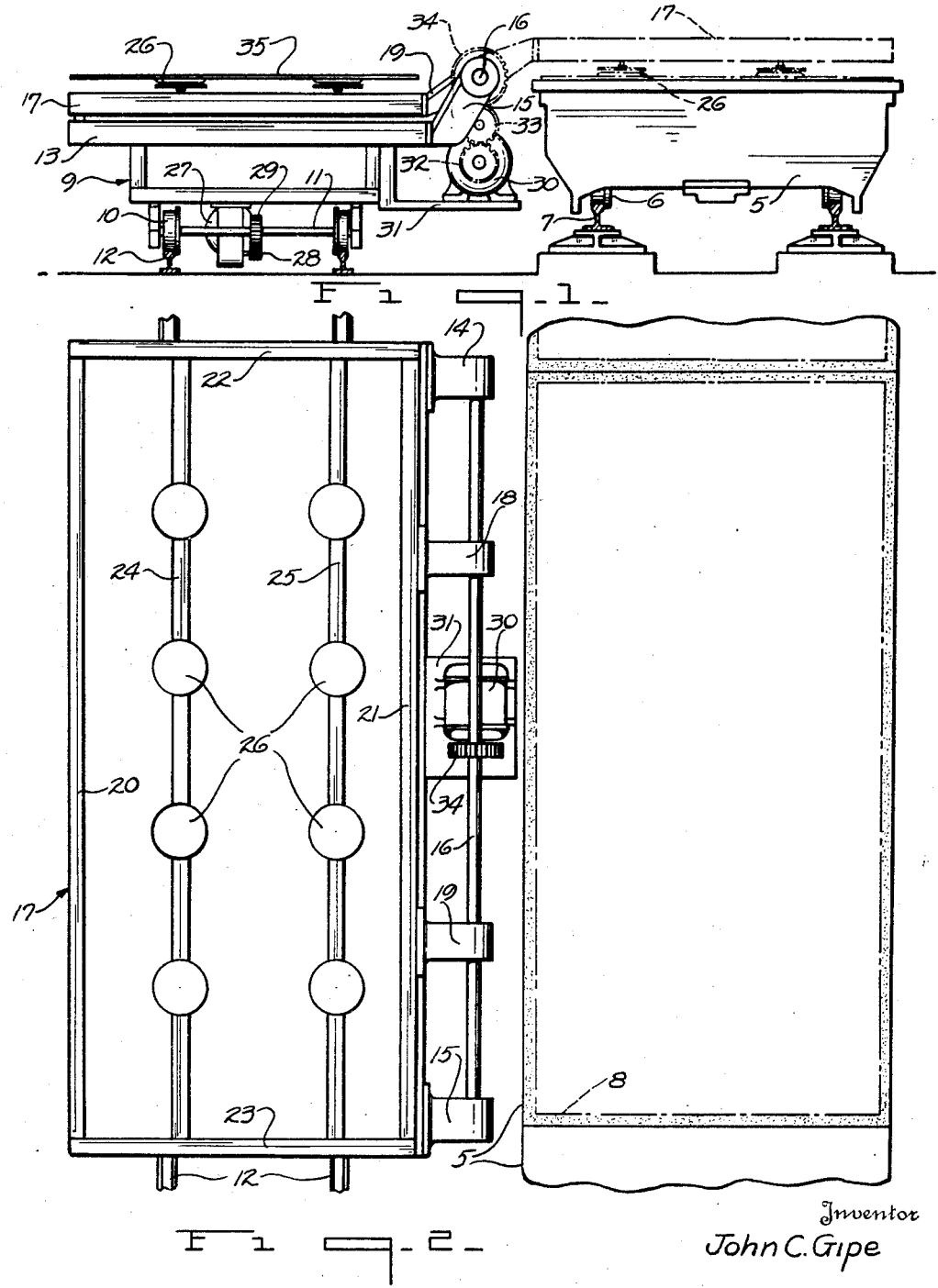

1,801,309

UNITED STATES PATENT OFFICE

JOHN C. GIPE, OF TOLEDO, OHIO, ASSIGNOR TO LIBBEY-OWENS-FORD GLASS COMPANY, OF TOLEDO, OHIO, A CORPORATION OF OHIO

GLASS-HANDLING APPARATUS

Application filed June 27, 1929. Serial No. 374,018.

This invention relates to apparatus for handling and turning over glass sheets or plates. The apparatus, as designed, may be used to accomplish two different purposes. Thus, the apparatus may be used for picking up glass from one car or carrier upon a track and turning it over to a position where it may be removed therefrom and laid upon a car or carrier on a second track. Also, the apparatus can be used to receive the glass plate thereon, turn the plate over and lay it upon a car or carrier traveling along a track. The invention has for its objects the provision of improved means for accomplishing the functions above set forth and the provision of such means movable parallel with the cars or carriers during the lifting of the glass therefrom or the laying of the glass thereupon.

Other objects and advantages of the invention will become more apparent during the course of the following description when taken in connection with the accompanying drawings.

In the drawings forming a part of this application and wherein like numerals are employed to designate like parts throughout the same.

Fig. 1 is an end elevation of apparatus provided by the present invention and illustrated in connection with a car or carrier from which the glass is to be removed or upon which it is to be laid, and Fig. 2 is a top plan view thereof.

In the continuous system for surfacing sheet glass, a plurality of cars or carriers are arranged end to end and adapted to carry glass sheets mounted thereupon first beneath a series of grinding units and then beneath a series of polishing units. Ordinarily, in such system there are employed at least two substantially parallel tracks one of which is designated the working track since it is along this track that the grinding and polishing units are mounted and the other the return track along which the cars are returned to the starting end of the working track. When using a single working track and a single return track, the glass sheets to be surfaced are secured upon the cars or carriers and passed along the working track to grind and polish the upper surface thereof after which the glass sheets are removed from the cars, turned over, again secured to the tables and then again passed along the working track to grind and polish the second side thereof. The apparatus of the present invention may be used to lift the glass sheets from the cars on the return track and turn them over so as to present their unground and unpolished surface uppermost or it may be used to receive the glass sheets, turn them over and lay them upon the cars on the working track with their unground and unpolished surfaces uppermost.

Referring to the drawings, the numeral 5 designates a plurality of cars or tables mounted upon wheels 6 rolling upon a trackway 7 which may be either the return track or the working track of the system, the cars 5 serving as a means for carrying the glass sheets 8 secured to their tops beneath a series of grinding and polishing units. The apparatus herein provided consists of a carriage 9 supported by wheels 10 mounted upon axles 11 and adapted to roll along the trackway 12 which is positioned to one side of but parallel with the trackway 7. The carriage 9 includes a stationary horizontal frame 13 provided at its inner side with the upwardly and outwardly inclined bracket arms 14 and 15 adjacent opposite ends thereof and within which is journaled the shaft 16.

Supported upon the stationary frame 13 is the movable or lifting frame 17, said frame being also provided at its inner side with the upwardly and outwardly inclined bracket arms 18 and 19 which receive the shaft 16 therethough and to which shaft said arms are secured. The movable frame 17 is substantially rectangular as shown in Fig. 2 and includes the longitudinally extending side members 20 and 21 and the transverse end members 22 and 23. Extending between the two end members 22 and 23 are the spaced parallel supporting members 24 and 25 each carrying a plurality of spaced suction devices or cups 26. The carriage 9 is adapted to be moved along trackway 12 upon operation of the motor 27 carried upon the underside thereof and having connected therewith a gear 28 meshing with and driving gear 29 secured to one of the wheels 11.

The movable frame 17 is adapted to be swung upon shaft 16 from a horizontal position over the carriage as indicated by the full lines in Fig. 1 to a horizontal position over the top of car 5 as indicated by the broken lines to either lay a glass sheet thereupon or lift the same therefrom. This swinging of the movable frame 17 is effected by means of a motor 30 carried by a horizontal bracket 31 secured to carriage 9, the shaft of motor 30 having mounted thereupon a gear 32 meshing with a gear 33 which in turn meshes with a gear 34 keyed upon shaft 16. Thus, upon operation of motor 30 in the proper direction, the shaft 16 will be actuated to swing the movable frame 17 through a vertical arc to a position either above the cars 5 or to a position above the carriage 9.

In operation, the cars 5 are adapted to move continuously at a relatively slow speed and therefore, during the lifting of the glass sheet therefrom or the laying of the sheet thereupon, the carriage 9 must move in the same direction and at the same speed along its trackway 12 and this is effected upon operation of motor 27. Assuming that the trackway 7 is the return track of the grinding and polishing system and that the glass sheets 8 secured upon the tops thereof have been ground and polished upon the upper surfaces only, the movable frame 17 is swung over the cars 5 to the position indicated by the broken lines in Fig. 1 so that the suction devices 26 will be lowered to engage the sheet. Suitable means may be provided to create the desired suction within the suction devices so that upon operation of the motor 30 to return the movable frame to its full line position over the carriage the sheet will be lifted from off of the car 5 and will be turned over so as to present its unground and unpolished side uppermost. The sheet can then be lifted from the movable frame upon the release of the holding suction and placed upon a car on the working track which will serve to carry it beneath the grinding and polishing units to surface the second side. Assuming, however, that the trackway 7 is the working track of the system, the glass sheet to be surfaced will be laid upon the suction devices 26 carried by movable frame 17 when said frame is in its horizontal position over the carriage with the unground and unpolished surface of the sheet facing downwardly. The movable frame is then swung upon the shaft 16 to its broken line position over the table 5 so as to lay the glass sheet upon said table with its surface to be ground and polished uppermost. Upon operation of motor 30, the frame can be pressed downwardly upon the table to force the glass into the plastic material which is usually employed to secure the sheets in place.

Thus, the invention may be used to accomplish two different purposes namely, the lifting of the glass sheets from the return track and turning them over to present their unground and unpolished surfaces uppermost or for receiving the glass sheets to be surfaced, turning them over and laying them upon the tables on the working track.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus of the character described, the combination with a series of cars movable in a horizontal direction and upon which glass sheets are adapted to be supported, of a carriage movable parallel with the cars, and suction means pivotally mounted upon the carriage and adapted to swing to a substantially horizontal position either over the cars or to a substantially horizontal position over said carriage, the sheet glass carried thereby being turned over during such movement.

2. In apparatus of the character described, the combination with a series of cars movable in a horizontal direction and upon which glass sheets are adapted to be supported, of a carriage movable parallel with the cars, a frame pivotally mounted upon said carriage, suction means carried by the frame, and means for moving said frame to a substantially horizontal position either over the cars or to a substantially horizontal position over said carriage, the glass sheet carried thereby being turned over during such movement.

3. In apparatus of the character described, the combination with a series of cars movable in a horizontal direction and upon which glass sheets are adapted to be supported, of means for lifting glass sheets from or laying them upon said cars including a carriage mounted to one side of the cars, means for moving the carriage in the same direction as and parallel with the cars, a frame on the carriage, means for pivotally mounting said frame, suction means carried by the frame, and means for swinging the frame through a vertical arch about its pivot to a horizontal position either over the cars or to a horizontal position over the carriage, the glass sheet carried thereby being turned over during such movement.

4. In apparatus of the character described, the combination with a series of cars movable in a horizontal direction and upon which glass sheets are adapted to be supported, of means for lifting glass sheets from or laying them upon said cars including a carriage mounted to one side of the cars, means for moving the carriage substantially parallel with said cars, means pivotally mounted upon said carriage for carrying the glass sheets, and means for swinging said last mentioned means through a vertical arc about its pivot to a substantially horizontal position either over the cars or to a substantially horizontal position over the carriage, the glass sheet carried thereby being turned over during such movement.

5. In apparatus of the character described, the combination with a series of cars movable in a horizontal direction and upon which glass sheets are adapted to be supported, of means for lifting glass sheets from or laying them upon said cars including a carriage mounted to one side of the cars, means for moving the carriage parallel with the cars, a frame pivotally mounted upon said carriage, means carried by the frame for carrying the glass sheets, and means for swinging the frame about its pivot to bring the glass sheets to a horizontal position either over the cars or to a horizontal position over the carriage, the glass sheets being turned over during such movement.

6. In apparatus of the character described, the combination with a series of cars movable in a horizontal direction and upon which glass sheets are adapted to be supported, of means for lifting glass sheets from or laying them upon said cars including a carriage mounted to one side of the cars, means carried by said carriage for moving the same in the same direction as and substantially parallel with the cars, a frame on the carriage, means for pivotally mounting said frame at the side of the carriage adjacent said cars, suction means carried by the frame, and means carried by said carriage for swinging the frame through a vertical arc about its pivot to a substantially horizontal position either over the cars or to a substantially horizontal position over the carriage, the glass sheet carried thereby being turned over during such movement.

Signed at Toledo, in the county of Lucas and State of Ohio, this 22nd day of June, 1929.

JOHN C. GIPE.